(12) United States Patent
Que et al.

(10) Patent No.: US 12,450,298 B2
(45) Date of Patent: Oct. 21, 2025

(54) METHOD AND APPARATUS FOR QUERYING RESOURCES THOROUGH SEARCH FIELD

(71) Applicant: Nokia Technologies Oy, Espoo (FI)

(72) Inventors: Yaochu Que, Beijing (CN); Ari Aarnio, Espoo (FI); Haisen Wang, Beijing (CN); Zhuoyuan Liao, Beijing (CN); Minghui Zhang, Beijing (CN); Shouyan Chen, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/109,688

(22) Filed: Feb. 14, 2023

(65) Prior Publication Data
US 2023/0205827 A1    Jun. 29, 2023

Related U.S. Application Data

(63) Continuation of application No. 14/772,263, filed as application No. PCT/CN2013/072807 on Mar. 18, 2013, now abandoned.

(51) Int. Cl.
| | |
|---|---|
| *G06F 16/951* | (2019.01) |
| *G06F 3/0482* | (2013.01) |
| *G06F 3/04842* | (2022.01) |
| *G06F 16/242* | (2019.01) |
| *G06F 16/955* | (2019.01) |

(52) U.S. Cl.
CPC .......... *G06F 16/951* (2019.01); *G06F 3/0482* (2013.01); *G06F 3/04842* (2013.01); *G06F 16/2423* (2019.01); *G06F 16/9566* (2019.01)

(58) Field of Classification Search
None
See application file for complete search history.

(56) References Cited

U.S. PATENT DOCUMENTS

| | | |
|---|---|---|
| 6,338,059 B1 | 1/2002 | Fields et al. |
| 6,834,276 B1 | 12/2004 | Jensen et al. |
| 7,603,350 B1 | 10/2009 | Guha |
| 7,958,143 B1 | 6/2011 | Amacker |

(Continued)

OTHER PUBLICATIONS

Schwartz, Barry, "iPhone's Spotlight Search," Jun. 22, 2009, https://searchengineland.com/iphones-spotlight-search-21357 (accessed Feb. 2, 2024), pp. 1-9, (Year: 2009).*

(Continued)

*Primary Examiner* — Richard L Bowen
(74) *Attorney, Agent, or Firm* — DITTHAVONG, STEINER & MLOTKOWSKI

(57) ABSTRACT

An approach is provided for providing a querying of one or more resources based on one or more terms from an input within at least one search field. A querying platform determines an input in at least one search field, the input comprising at least one resource identifier and one or more terms. The querying platform further causes, at least in part, a querying of one or more resources associated with the at least one resource identifier for content based, at least in part, on the one or more terms. The querying platform also causes, at least in part, a querying of one or more resources associated with the at least one resource identifier for content based, at least in part, on the one or more terms.

19 Claims, 13 Drawing Sheets

(56) References Cited

U.S. PATENT DOCUMENTS

| | | | |
|---|---|---|---|
| 8,239,206 B1* | 8/2012 | LeBeau | H04W 4/50 707/769 |
| 2006/0026147 A1 | 2/2006 | Cone et al. | |
| 2007/0055656 A1 | 3/2007 | Tunstall-Pedoe | |
| 2008/0033917 A1 | 2/2008 | Jones et al. | |
| 2008/0183573 A1 | 7/2008 | Muschetto | |
| 2009/0299887 A1* | 12/2009 | Shiran | G06Q 30/02 705/35 |
| 2009/0307615 A1* | 12/2009 | Jalon | G06F 3/0483 707/E17.014 |
| 2010/0114887 A1* | 5/2010 | Conway | G06F 3/0237 707/E17.014 |
| 2010/0306191 A1* | 12/2010 | LeBeau | G06F 16/24578 707/723 |
| 2011/0022635 A1* | 1/2011 | Michael | G06F 16/2428 707/E17.062 |
| 2011/0066970 A1 | 3/2011 | Burrier et al. | |
| 2011/0137933 A1* | 6/2011 | Pelenur | G06F 16/9577 707/769 |
| 2011/0258049 A1 | 10/2011 | Ramer et al. | |
| 2013/0218870 A1* | 8/2013 | Bukurak | G06F 16/248 707/722 |
| 2013/0339345 A1* | 12/2013 | Soto Matamala | G06F 16/248 707/722 |

OTHER PUBLICATIONS

International Search Report and Written Opinion received for corresponding Patent Cooperation Treaty Application No. PCT/CN2013/072807, dated Dec. 12, 2013, 13 pages.

\* cited by examiner

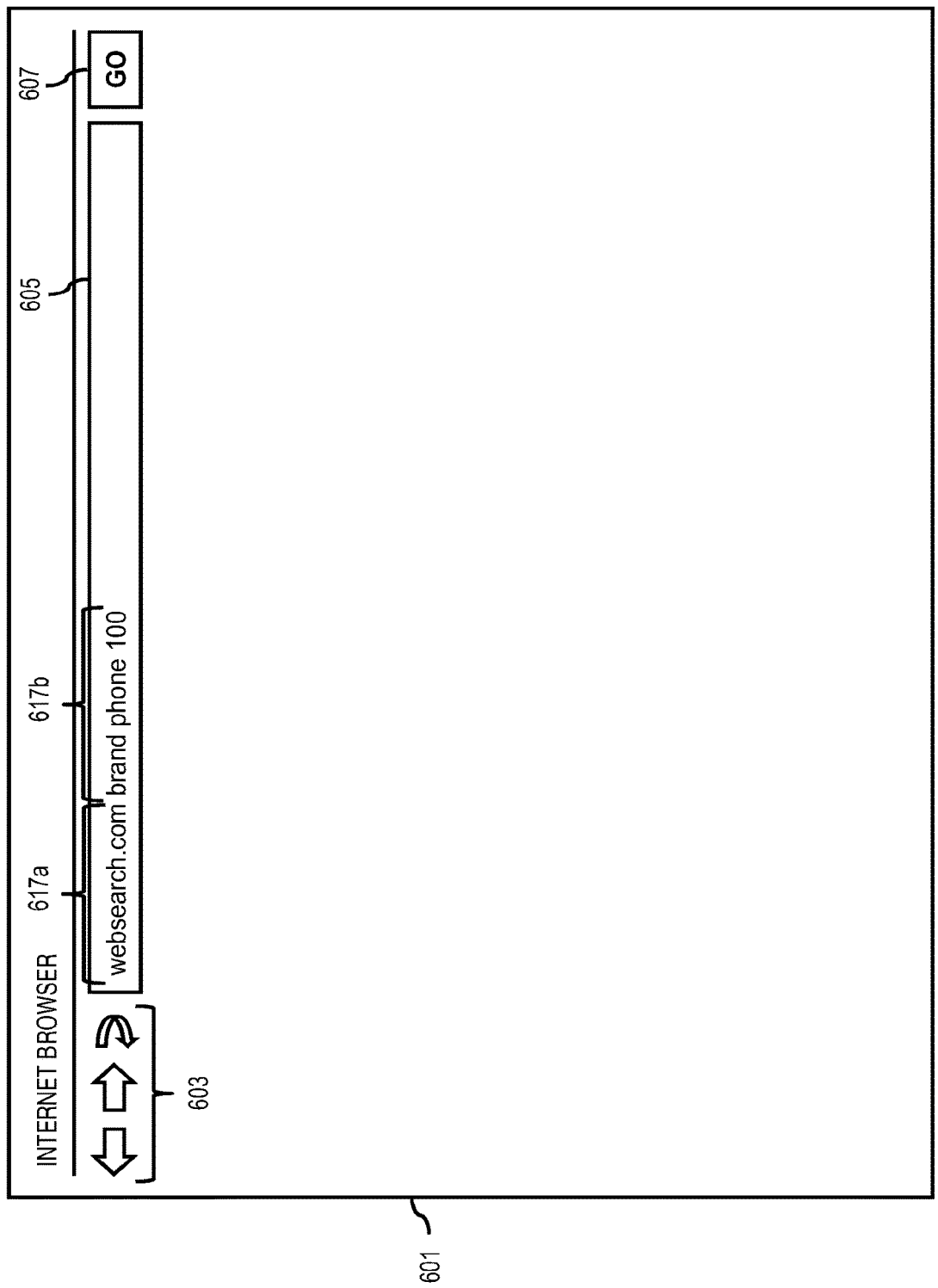

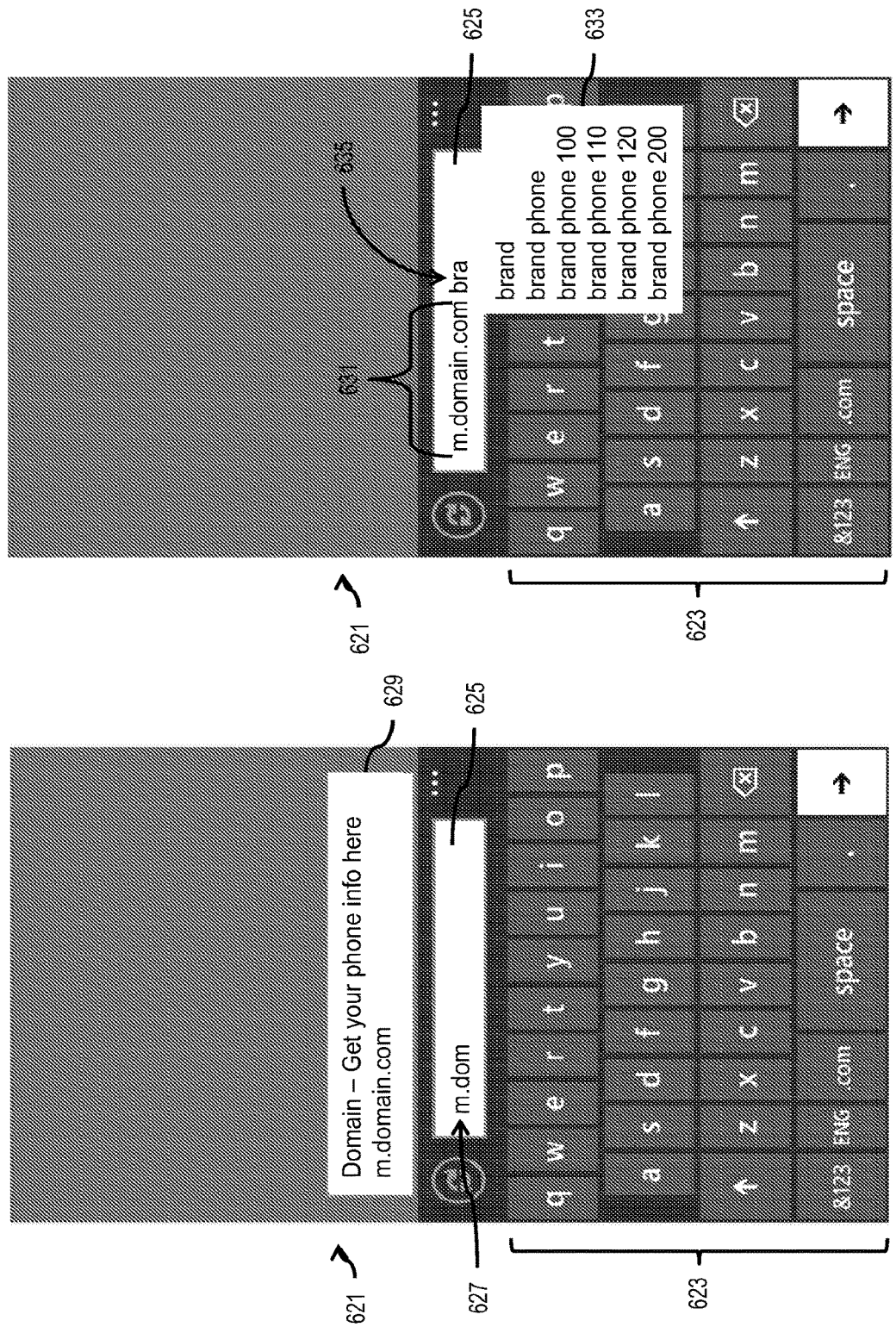

METHOD AND APPARATUS FOR QUERYING RESOURCES THOROUGH SEARCH FIELD

CROSS REFERENCE TO RELATED APPLICATIONS

This application is a Continuation of U.S. patent application Ser. No. 14/772,263 filed on Sep. 2, 2015 entitled "METHOD AND APPARATUS FOR QUERYING RESOURCES THOROUGH SEARCH FIELD," which claims priority to a PCT Application No. PCT/CN2013/072807 filed on Mar. 18, 2013, which is incorporated herein by reference in its entirety.

BACKGROUND

Service providers and device manufacturers (e.g., wireless, cellular, etc.) are continually challenged to deliver value and convenience to consumers by, for example, providing compelling network services. One way of providing value and convenience is reducing the time and/or effort associated with completing routine or common tasks. A common task consumers perform on is navigating to a resource and querying the resource for one or more terms. Such a task generally requires the consumer navigating to separate resources to query the resources based on the one or more terms, and requires multiple steps. Accordingly, service providers and device manufacturers face significant technical challenges associated with simplifying querying the resources using the one or more terms.

SOME EXAMPLE EMBODIMENTS

Therefore, there is a need for an approach for providing a querying of one or more resources based on one or more terms from an input within at least one search field.

According to one embodiment, a method comprises determining an input in at least one search field, the input comprising at least one resource identifier and one or more terms. The method also comprises causing, at least in part, a querying of one or more resources associated with the at least one resource identifier for content based, at least in part, on the one or more terms. The method further comprises causing, at least in part, a presentation of the content in response to the input.

According to another embodiment, an apparatus comprises at least one processor, and at least one memory including computer program code for one or more computer programs, the at least one memory and the computer program code configured to, with the at least one processor, cause, at least in part, the apparatus to determine an input in at least one search field, the input comprising at least one resource identifier and one or more terms. The apparatus is also caused to cause query one or more resources associated with the at least one resource identifier for content based, at least in part, on the one or more terms. The apparatus is further caused to present the content in response to the input.

According to another embodiment, a computer-readable storage medium carries one or more sequences of one or more instructions which, when executed by one or more processors, cause, at least in part, an apparatus to determine an input in at least one search field, the input comprising at least one resource identifier and one or more terms. The apparatus is also caused to query one or more resources associated with the at least one resource identifier for content based, at least in part, on the one or more terms. The apparatus is further caused to present the content in response to the input.

According to another embodiment, an apparatus comprises means for determining an input in at least one search field, the input comprising at least one resource identifier and one or more terms. The apparatus also comprises means for causing, at least in part, a querying of one or more resources associated with the at least one resource identifier for content based, at least in part, on the one or more terms. The apparatus further comprises means for causing, at least in part, a presentation of the content in response to the input.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6A-6F are diagrams of user interfaces utilized in the processes of FIGS. 3-5, according to various embodiments;

DESCRIPTION OF SOME EMBODIMENTS

Examples of a method, apparatus, and computer program for providing a querying of one or more resources based on one or more terms from an input within at least one search field are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
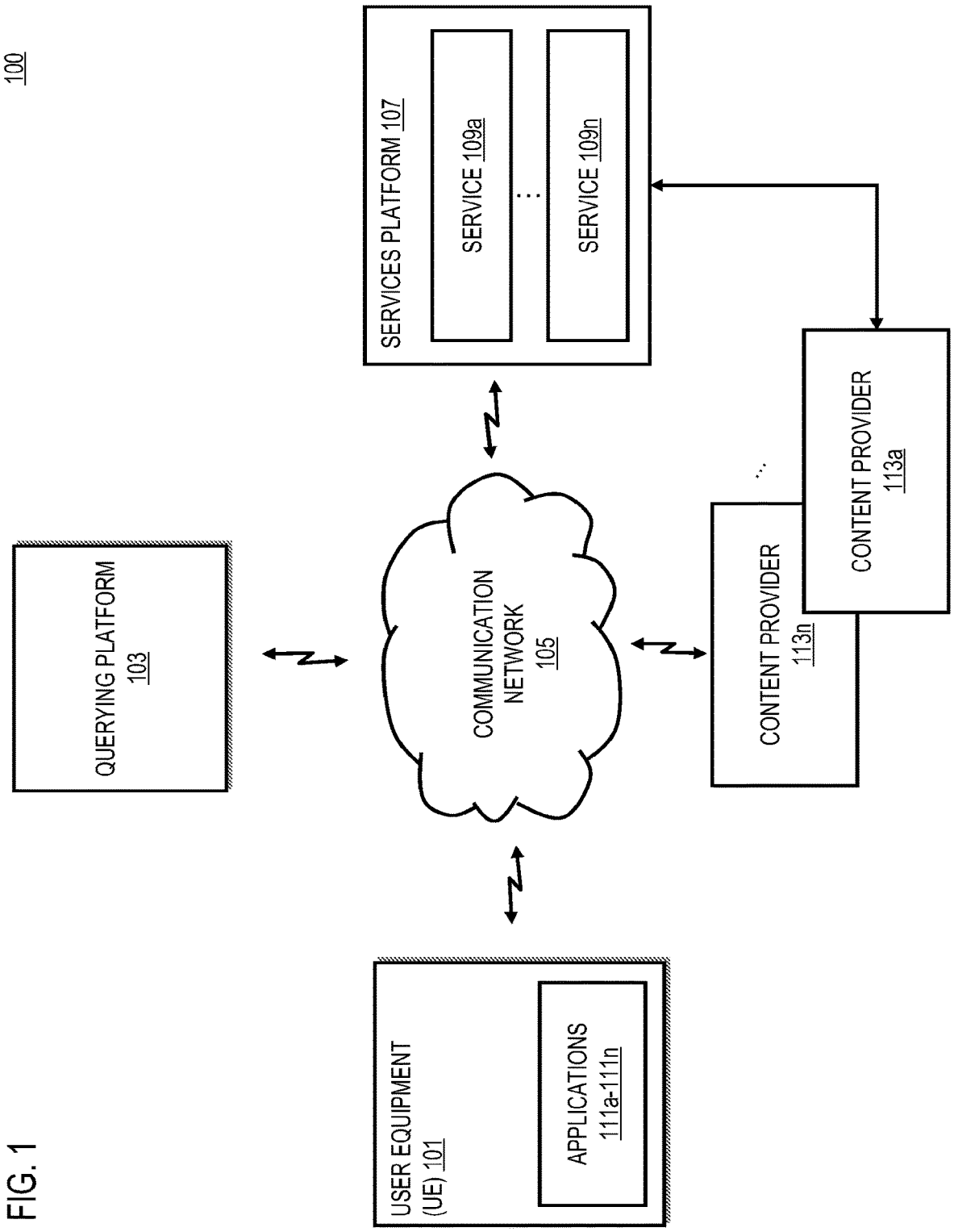
FIG. 1 is a diagram of a system capable of providing a querying of one or more resources based on one or more terms from an input within at least one search field, according to one embodiment.

FIG. 1 is a diagram of a system capable of causing, at least in part, a querying of one or more resources associated with the at least one resource identifier for content based, at least in part, on one or more terms entered into a search field, according to one embodiment. As discussed above, service providers and device manufacturers attempt to provide convenience to consumers. Despite these efforts, with respect to querying one or more resources, consumers must first navigate to the resources and subsequently query the resources based on one or more terms. As such, the user must use multiple different search fields and performs multiple different steps to query different resources. When performed numerous times, the multi-step sequence can become tedious. Further, although search fields exist that allow a user to enter one or more terms to subsequently query a resource, the search fields are tied to the one or more resources, which limits the flexibility of the search fields.

To address these problems, a system 100 of FIG. 1 introduces the capability to provide a querying of one or more resources based on one or more terms from an input within at least one search field. The system 100 can determine an input from the at least one search field. The input can include at least one resource identifier and one or more terms. Upon determining the input, the system 100 can cause, at least in part, a querying of one or more resources for content based, at least in part, on the one or more terms. The one or more resources that are queried are based, at least in part, on the at least one resource identifier included in the input. Further, upon querying the one or more resources, the system 100 can cause, at least in part, a presentation of the content in response to the input. Based on the foregoing, a user can use a single search field to query multiple different resources. Thus, a user no longer needs to navigate to a specific search field tied to specific resource the user wants to query.

As shown in FIG. 1, the system 100 comprises user equipment (UE) 101 having connectivity to a querying platform 103 via a communication network 105. Although FIG. 1 illustrates only one UE 101, the system 100 can accommodate any number of UE 101s. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, near field communication (NFC), Internet Protocol (IP) data casting, digital radio/television broadcasting, satellite, mobile ad-hoc network (MANET), and the like, or any combination thereof.

The UE 101 is any type of mobile terminal, fixed terminal, or portable terminal including a mobile handset, station, unit, device, mobile communication device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

The UE 101 may execute one or more applications 111a-111n (collectively referred to as applications 111). The applications 111 may include any type of application that may be executed at the UE 101, such as an Internet browser application, email application, messaging application, calendar application, file system application, mapping application, navigation application, operating system, etc. For example, an application 111a may be an Internet browser application that allows a user associated with the UE 101 to browse one or more websites. An application 111b may be an email application that allows a user associated with the UE 101 to receive, send and view one or more emails associated with one or more email accounts. Further, an application 111c may include a file system application or an operating system that allows a user to view one or more files associated with the UE 101, such as being stored locally at the UE 101 or stored externally and accessible through the UE 101 (e.g., stored in a cloud). In one embodiment, one or more applications constitute one or more resources. By way of example, an email application 111b may constitute a resource associated with accessing, sending a viewing emails. A file system application 111c may constitute a resource associated with locating, viewing and controlling one or more files within a file system. Further, in one embodiment, one or more of the applications 111 may be associated with accessing and/or using a resource, such as an Internet browser application 111a being used to access the resource of a website, or an email application 111b being used to access the resource of a database of emails.

The system 100 further includes the services platform 107 that includes one or more services 109a-109n (collectively referred to as services 109). Although FIG. 1 illustrates one services platform 107, the system 100 may include any number of services platforms 107. The services platform 107 may constitute any platform that provides one or more services 109 to the system 100 and that is accessible through the communication network 105. In one embodiment, the services platform 107 may constitute an Internet web search engine that provides the service of searching the Internet based on one or more keywords. In one embodiment, the services platform 107 may constitute one or more information provisioning service platforms with one or more information provisioning services 109, such as one or more news organizations. Such a platform may provide one or more websites for browsing the information. Such information may include, for example, current news information, weather information, sports information, a knowledge resource, etc. In one embodiment, the services platform 107 with the services 109 may include a cloud-based storage service that allows a user to store user information. Accordingly, the services platform 107 may provide one or more types of services 109 to the system 100.

In one embodiment, the services platform 107 and/or one or more of the services 109 constitute one or more resources. By way of example, a service 109a may be an Internet search engine that provides a user the ability to query the Internet based on one or more keywords. Further, a service 109b may be an Internet website that provides or includes content, which may include text, images, sounds, videos, or any other multimedia content. In one embodiment, the content may be tailored to a specific subject or topic, such as a website that provides world news, national news, local news, a distributed information database, etc.

The system 100 may further include one or more content providers 113a-113n (collectively referred to as content providers 113). The content providers 113 may provide content to the elements of the system 100, such as to the UE 101 and/or the querying platform 103. The content may be, for example, various content items, such as audio, images and video. In one embodiment, the content providers 113 may constitute one or more resources, such as one or more cloud-based storage providers that can be queried for one or more stored content items.

The querying platform 103 provides for querying one or more resources based on one or more terms from an input within at least one search field within the system 100. Although the querying platform 103 is illustrated as an independent element in FIG. 1, the querying platform 103 can be associated and/or integrated with one or more other elements. By way of example, in one embodiment, the UE 101 may include an application 111d that performs the functionality of the querying platform 103. Further, in one embodiment, one or more applications 111 on the UE 101 may include built-in functionality of the querying platform 103. Further, in one embodiment, the services platform 107 and/or one or more services 109 on the services platform 107 may perform the functionality of the querying platform 103.

As discussed above, the querying platform 103 may determine at least one resource identifier in an input of at least one search field. The at least one resource identifier can constitute any format for identifying a resource, and identify the resource either in whole or in part. By way of example, the resource identifier can be a Uniform Resource Identifier (e.g., URI). In one embodiment, the URI can, more specifically, be one of a Uniform Resource Locator (e.g., URL) and a Uniform Resource Name (e.g., URN). Thus, a resource identifier in an input of a search field can include, for example, brand.com, www.brand.com, http://www.brand.com, ftp://brand.com/, etc. In the foregoing examples, the resource associated with the resource identifier may constitute, for example, the website identified by the URL http://www.brand.com. More specifically, the resource may be the domain associated with the URI, http://www.brand.com or, in one embodiment, may be one or more sub-domains. Thus, the input resource identifier may be an abbreviation of an existing resource identifier.

In one embodiment, the resource identifier may be based, at least in part, on one or words associated with one or more applications 111. By way of example, the words email, calendar, phonebook, file explorer may constitute resource identifiers. For the foregoing resource identifiers, the corresponding resources may be, for example, an email application 111b, a calendar application 111e, a phonebook application 111f, and a file system application 111c, respectively. Further, although the foregoing resource identifiers are one or more types of applications, the resource identifiers may be the title of the particular application, such as the resource identifier of Your Email as the resource identifier for the resource of the application Your Email!

In one embodiment, the querying platform 103 allows a user of a UE 101 to customize the one or more resource identifiers by pre-defining the resource identifier and the corresponding resource. By way of example, the querying platform 103 allows a user to specify the word email as the resource identifier corresponding to the resource of an email application 111b, or to specify the word websearch as the resource identifier corresponding to the resource of an Internet search engine.

As discussed above, the querying platform 103 further determines one or more terms within the at least one search field. The one or more terms specify what is being queried at the one or more resources associated with the at least one resource identifier. The one or more terms may include, for example, one or more keywords, one or more operators acting on the one or more keywords, or a combination thereof. The one or more keywords specify the subject and/or topic of what is being queried. The one or more operators may act on the one or more keywords and/or the resource. For example, the operators may further define the relationship of the one or more terms to each other and/or to the resource identified by the resource identifier. By way of example, the operators may include Boolean operators, such as AND, OR, NOT, etc. The operators may further include proximity operators, such as NEAR, BEFORE, AFTER, WITHIN, etc. The operators may further include wildcard operators, such as * for expanding a term to include all forms of a root term, or ? for expanding a search a term to include all forms of a root term with one additional character. The operators may be any other known operator to one having ordinary skill in the art that act on the one or more terms and/or the resource identifier by the resource identifier.

In one embodiment, the querying platform 103 receives the input from a search field associated with an application 111, a services platform 107, a service 109, or a content provider 113. By way of example, an Internet browser application 111a may include an address bar for conventionally specifying an address of a website to navigate to using the Internet browser application 111a. In such an embodiment, the querying platform 103 may receive the input from the address bar of the Internet browser application 111a. In one embodiment, an application 111c corresponding to a file system and/or an operating system of the UE 101, or one or more other applications 111 executed on the UE 101, may include a search field. By way of example, a home screen and/or portion of an operating system of a UE 101 may include a search field for finding information within one or more applications 111 and/or stored at the UE 101. In this embodiment, the querying platform 103 may receive the input from the search field.

Further, in one embodiment, the querying platform 103 may cause a presentation of a search user interface element for entry of the input. By way of example, the querying platform 103 may cause a widget to be presented on the UE, 101, such as within the home screen of the UE 101. Thus, where the UE 101 may otherwise not include a search field, the querying platform 103 may cause a presentation of a search user interface element to receive the input.

In one embodiment, the querying platform 103 may provide a predictive input for the input. The predictive input may be for the at least one resource identifier, the one or more terms, or a combination thereof. The predictive input allows for one or more recommendations for the resource identifier, the one or more terms, or a combination within the input as a user enters one or more characters. The recommendations of the predictive input can be based on information stored locally at the UE 101, at the querying platform 103 associated with the UE 101, associated with one or more UE 101, one or more services 109, and/or one or more content providers 113. By way of example, the recommendations of the predictive input may be based on content within the resource associated with a resource identifier at least partially entered. Further, in one embodiment, the predictive input may be provided in conjunction with one or more predictive input services, such as at the services platform 107. By way of example, as the user enters characters for the resource identifier, the querying platform 103 may recommend one or more possible resource identifiers based on past resource identifiers the user has entered. Upon the user entering the resource identifier and/or selecting one or more recommended resource identifiers, the querying platform 103 may further provide predictive input of the one or more terms. The one or more terms are predicted according to the same method and can include predicting both keywords and operators.

In one embodiment, the user may implicitly select a recommended resource identifier with the predictive input portion by stopping the entry of the resource identifier and continuing to enter one or more terms. Such an implicit selection may be based on the first or only recommended resource identifier provided in the predictive input portion 629. Further, in one embodiment, upon the user entering the resource identifier or selecting a recommended resource identifier, the querying platform 103 may navigate to the resource associated with the resource identifier prior to the user entering one or more terms. In one embodiment, as the user enters the a partial resource identifier entry, the querying platform 103 may navigate to one or more resources associated with the recommended resource identifiers provided by a predictive input in anticipation of the user selecting one of the recommended resource identifiers.

Upon the querying platform 103 receiving the input, the querying platform 103 causes a querying of one or more resources associated with the at least one resource identifier for content based, at least in part, one the one or more terms. In one embodiment, where the resource identifier is associated with an Internet search engine, the querying platform 103 can access the Internet search engine and query the one or more terms using the search engine. The one or more results of the search engine query can then be returned based on the original input in the search field of the resource identifier and the one or more terms. Accordingly, the querying platform 103 allows a user to query more than one Internet search engine without having to manually navigate to a search associated with each specific Internet search engine.

In one embodiment, the querying platform 103 can cause, at least in part, a navigation to one or more resources associated with the resource identifier. The navigation may include, for example, browsing to an Internet website associated with the resource identifier for querying the one or more terms. In one embodiment, the navigation may include directing an Internet browser application 111a to a URL associated with the resource identifier. Based on the one or more terms and the content associated with the URL, the querying platform 103 may further direct the Internet browser application 111a to another URL associated with the content. The navigation may alternatively include, for example, navigating to an application 111 executed at the UE 101 for querying the one or more terms.

Upon querying the one or more terms, the querying platform 103 may then cause a presentation of the content within the context of the one or more resources. Where, for example, the resource is an Internet search engine, the presentation of the content may be in the form of presenting the search results in the context of an Internet search engine results website based on the one or more terms. Where, for example, the resource is a website (which may not constitute an Internet search engine), the presentation of the content may be in the form of presenting the one or more terms from the input in the context of the website. In one embodiment, the presentation may include emphasizing the one or more terms within the context of the resource. The emphasis may include any format change that even further distinguishes the one or more terms presented from the other content of the resource. By way of example, the emphasis may include highlighting, holding, underlining, italicizing, increasing a font size, inverting, etc.

In one embodiment, where the at least one resource is associated with an application 111, the querying platform 103 can cause an initiation of the one or more applications for performing the querying of the one or more resources, the presentation of the content, or a combination thereof. By way of example, where the at least one resource identifier in the input includes an email application 111b, the querying platform 103 may initiate the email application 111b for performing the querying. In such an example, the one or more terms may be associated with a particular email that the user is looking for. Further, the querying platform 103 may initiate the email application 111b for presenting one or more emails that match the one or more terms based on results of the query.

By way of example, the UE, 101, the querying platform 103, the services platform 107, and the content providers 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
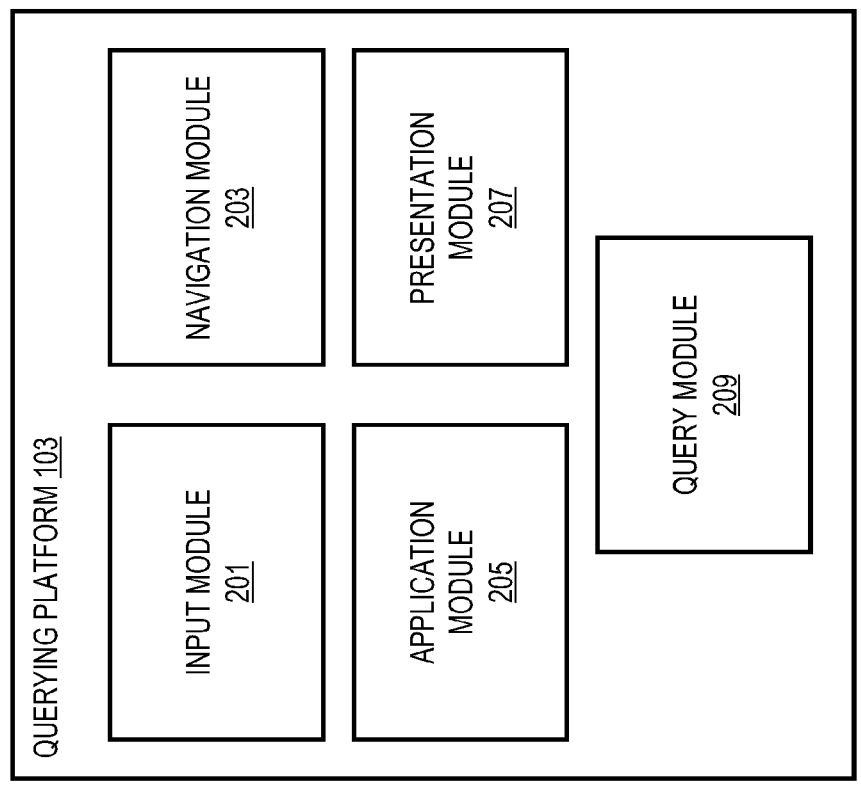
FIG. 2 is a diagram of the components of a querying platform, according to one embodiment.

FIG. 2 is a diagram of the components of the querying platform 103, according to one embodiment. By way of example, the querying platform 103 includes one or more components for providing a querying of one or more resources based on one or more terms from an input within at least one search field. It is contemplated that the functions of these components may be combined in one or more components or performed by other components of equivalent functionality. In this embodiment, the querying platform 103 includes an input module 201, a navigation module 203, an application module 205, a presentation module 207 and a query module 209.

The input module 201 receives the input from at least one search field. The search field may be associated with an application 111 and/or a service 109 that is separate from the querying platform 103. The querying platform 103 may interface with the application 111 and/or the service 109 to receive the input. In such a case, the application 111 and/or service 109 may already include the search field. By way of example, an Internet browser application 111a may include an address bar for conventionally entering an address of a website. The querying platform 103 may interface with the Internet browser application 111a to receive the input from the address bar. In one embodiment, the querying platform 103 may further create and present a search user interface element at a user interface associated with the UE 101 for entry of the input and for directly receiving the input. The querying platform 103 may cause a presentation of the search user interface element where an application 111 and/or service 109 does not already include a search field.

In one embodiment, the input module 201 can provide predictive input for the at least one resource identifier, the one or more terms, or a combination thereof. The predictive input provides one or more recommendations for the at least one resource identifier, the one or more terms, or a combination thereof as one or more characters of the input are entered. The recommendations may be based on, for example, one or more behaviors and/or profiles associated with the UE 101, the user of the UE 101, or a combination thereof, crowd sourcing information, context information, or a combination thereof. Information used for making the recommendations may be stored locally at the UE 101 and/or externally, such as at one or more services 109 and/or content providers 113.

The navigation module 203 may cause a navigation to one or more resources associated with the resource identifier in the input. The navigation may include navigating to one or more resources local and/or external to the UE 101. The navigation may include, for example, navigating to an external website, such as directing an Internet browser application 111a to navigate to a URL associated with or represented by the resource identifier. The navigation may also include navigating to a content provider 113. The navigation may further include causing the Internet browser application 111a to navigate to multiple URLs in series based on the results of the querying with respect to multiple resources associated with the URLs. By way of example, an initial navigation may be to a first website that includes one or more linked websites. Based on the result of the query of the first website, one or more of the linked websites may be associated with the one or more terms. Accordingly, the navigation module 203 may cause a navigation to one of the lined websites. The navigation may also include navigating to an internal application 111 executing on the UE 101 associated with the resource identifier.

In one embodiment, when the querying platform 103 navigates to one or more resources, the navigation may occur as entry of the resource identifier is completed but prior to completing entry of the input. By way of example, upon entering a resource identifier but prior to entering one or more terms, the querying platform 103 may cause a navigation to the resource associated with the resource identifier and may query the resource based on the one or more terms as the terms are subsequently entered.

The application module 205 may interface with one or more applications 111 at the UE 101 for performing the querying and/or presenting of the content. Where the input includes a resource identifier associated with an application 111, the application module 205 may determine whether the application 111 is currently running at the UE 101. If the application 111 is not running, the application module 205 can cause an initiation of the application. Further, the application module 205 can cause the application 111 to perform the querying using one or more functions and/or processes internal to the application 111, such as search for an email, a song, a video, a calendar entry, etc. Further, the application module 205 can interface with the application 111 to cause a presenting of the content associated with the one or more terms. The application module 205 can interface with the applications 111 according to one or more application programming interfaces (API).

The presentation module 207 causes the presentation of the content from the one or more resources. Where one or more applications 111 are associated with presenting the content, the presentation module 207 can interface with the application module 205 for determining how the content is presented and the context of the presentation. By way of example, where an Internet browser application 111a is presenting content based on the querying, the presentation module 207 can interface with the application module 205 to determine how the content is presented within the Internet browser application 111b. The presentation module 207 can further cause an emphasizing of the one or more terms in the presentation of the content. The emphasizing can include highlighting, bolding, underlining, etc. the one or more terms in the content to distinguish the terms within the content.

The query module 209 queries the one or more resources associated with the resource identifier for content that is based, at least in part, on the one or more terms from within the input. The querying may be in conjunction with a resource, such as interfacing with an application for querying a resource associated with an application; for example a list of emails, a group of songs, a calendar of appointments, etc. The querying may also include querying for where the one or more terms appear in content of a resource, such as querying where one or more terms appear in the content of a website. The querying may also include using an Internet search engine to query for the one or more terms within the Internet. The query module 209 determines the resource associated with the resource identifier within the input and determines to query the resource. Accordingly, within a single search field, a user may specify different resource identifiers associated with different resources. Thus, the user may query one or more terms with different resources from the convenience of a single search field and with the convenience of entering a single input, requiring only one step.

Figure 3:
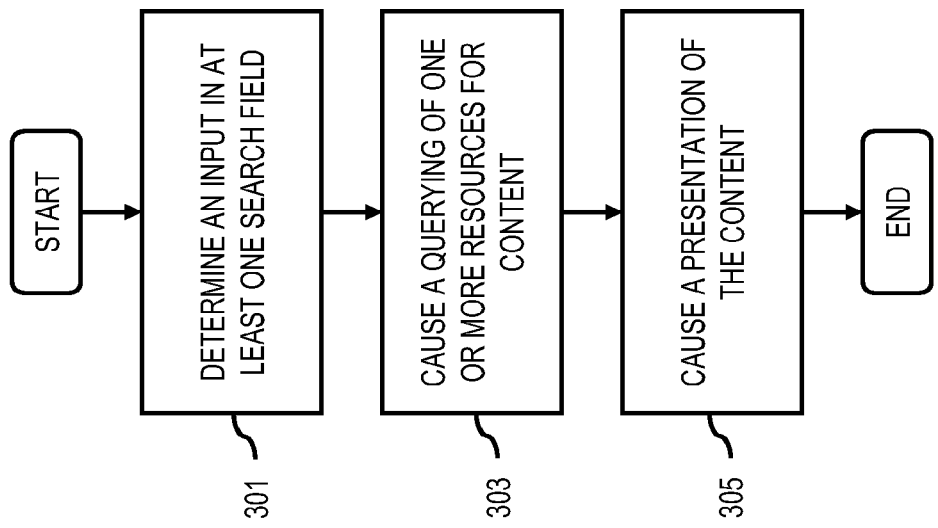
FIG. 3 is a flowchart of a process for providing a querying of one or more resources based on one or more terms from an input within at least one search field, according to one embodiment.
Figure 8:
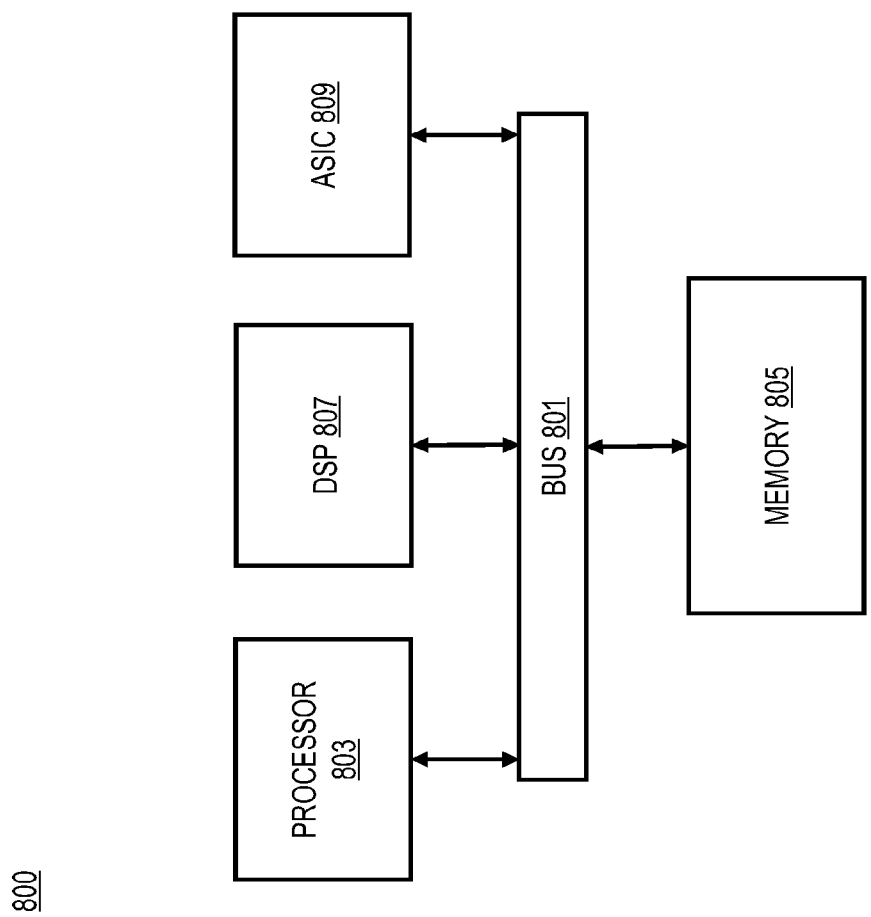
FIG. 8 is a diagram of a chip set that can be used to implement an embodiment of the invention.

FIG. 3 is a flowchart of a process for providing a querying of one or more resources based on one or more terms from an input within at least one search field, according to one embodiment. In one embodiment, the querying platform 103 performs the process 300 and is implemented in, for instance, a chip set including a processor and a memory as shown in FIG. 8. In step 301, the querying platform 103 determines an input in at least one search field. In one embodiment, the search field may be an address bar associated with an Internet browser application 111a or a search field associated with a home page of an UE 101. The one or more terms may include one or more keywords describing content that the user would like to query at the resource. The one or more terms may also include one or more operators for acting on the one or more keywords or the at least one resource identifier.

The at least one resource identifier within the input be of any format for identifying a resource, and identify the resource either in whole or in part. By way of example, the where resource identifier is based on a URI, the resource identifier be entered into the search field as domain.com. However, a full URL may be http://www.domain.com. Thus, either of these may be entered as the resource identifier in the input, or a variation between the two. Thus, a resource identifier in an input of a search field can include, for example, domain.com, www.domain.com, http://www.domain.com, ftp://domain.com/, etc. In the foregoing examples, the resource associated with the resource identifier may constitute, for example, the website identified by http://www.domain.com. More specifically, the resource may be the domain associated with http://www.domain.com or, which may include sub-domains. Further, the resource identifier may be any resource identifier described above, and may be associated with any resource as described above.

In step 303, the querying platform 103 causes, at least in part, a querying of one or more resources associated with the at least one resource identifier for content based, at least in part, on the one or more terms. The querying can include, for example, the querying platform 103 analyzing content associated with the at least one resource for the one or more terms. The querying can also include, by way of example, the querying platform 103 causing one or more applications 111, services 109, content providers 113, or a combination thereof associated with the resource to query the resource for the one or more terms. By way of example, the querying platform 103 may cause an email application 111b to query for one or more emails associated with the one or more terms. Further, the querying platform 103 may cause a file system application 111c to query for one or more elements within a file structure (e.g., files, directories, drives, etc.) based on the one or more terms. Further, the querying platform 103 may cause an Internet search engine associated with the resource to query for content based on the one or more terms. Thus, the querying can be performed by the querying platform 103, or may be directed by the querying platform 103 and performed by one or more applications 111, one or more services 109, and/or one or more content providers 113.

In step 305, the querying platform 103 causes, at least in part, a presentation of the content in response to the input. The querying platform 103 may cause, for example, one or more applications 111 associated with the resource to present content based on the one or more terms. The content may be, for example, information presented by a website, one or more search results provided by an Internet search engine, etc. Accordingly, in one embodiment the content is presented within the context of the one or more resources. However, the querying platform 103 may alternatively cause a presenting of the content independent of the context of the one or more resources. By way of example, the querying platform 103 may cause a presentation of a list of results from an Internet search engine independently from the context of the results associated with the Internet search engine. Thus, the results of the querying may be presented in a single context and/or location independent of the resource that is queried.

In accordance with the process 300, a user can enter a single input, which may include at least one resource identifier and one or more terms, into a search field and query various resources merely by changing the resource identifier. As such, the querying can be more efficient by allowing the user to enter the resource and the terms into a single input.

Figure 4:
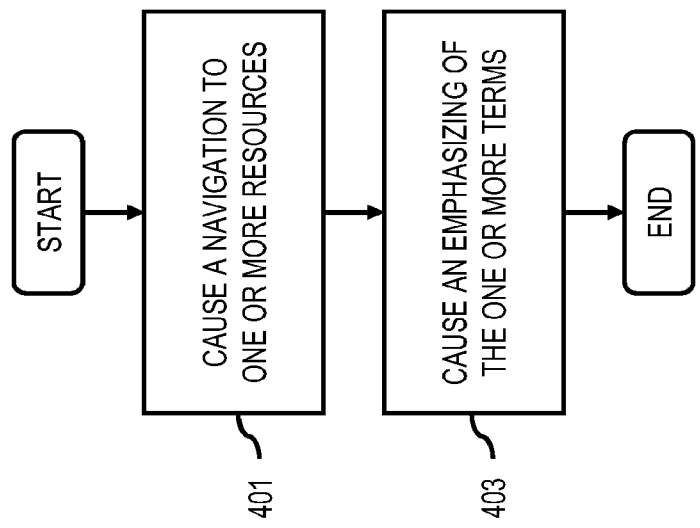
FIG. 4 is a flowchart of a process for navigating to one or more resources in response to an input in at least one search field, according to one embodiment.

FIG. 4 is a flowchart of a process for navigating to one or more resources in response to an input of the one or more resources and one or more terms in at least one search field, according to one embodiment. In one embodiment, the querying platform 103 performs the process 400 and is implemented in, for instance, a chip set including a processor and a memory as shown in FIG. 8. In step 401, the querying platform 103 causes, at least in part, a navigation to the one or more resources. The navigation to the one or more resources may constitute the querying platform 103 causing an application to navigate to the resources, such as by causing an application associated with a cloud storage service to navigate to a website associated with the cloud storage. The navigation may also constitute causing an Internet browser application 111*a* to navigate to a specific website that is identifier as the resource.

After querying the one or more resources based on the one or more terms, and presenting the content from the one or more resources, in step 403 the querying platform 103 may cause, at least in part, an emphasizing of the one or more terms in the presentation of the content. Thus, the presentation of the content may include emphasizing the portions of the content that correspond to the one or more terms. The emphasis may include any format change that distinguishes the one or more terms from the other content. By way of example, the emphasis may include highlighting, bolding, underlining, italicizing, increasing a font size, etc. Thus, by way of example, upon querying for an email associated with an email resource, the one or more terms appearing in the bodies of one or more emails may be distinguished from the other words in the emails by, for example, highlighting the one or more terms. Emphasizing the terms allows the user to quickly see where in the emails the one or more terms appear. By way of another example, a user may query a website based on one or more terms to determine where in the website the terms appear. Upon presenting the website within the context of the Internet browsing application 111*a*, the querying platform 103 may cause the one or more terms appearing within the content to be emphasized from other words within the content. Thus, the user can quickly distinguish what part of the website corresponds to the search terms and what part does not.

Figure 5:
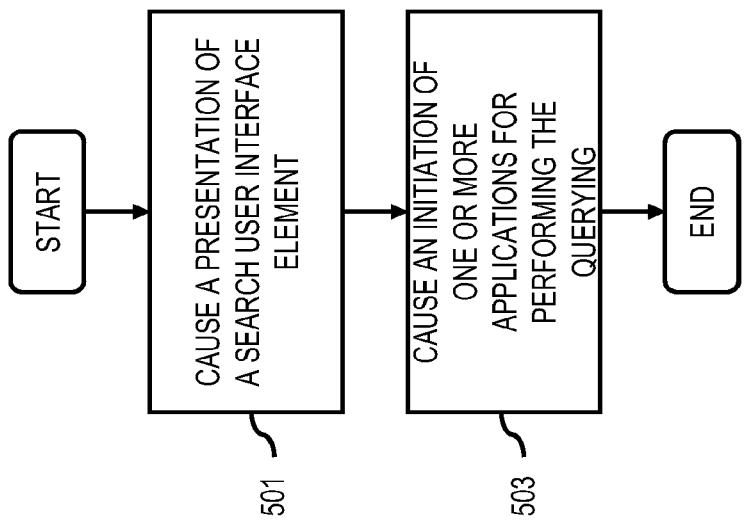
FIG. 5 is a flowchart of a process for initiating one or more applications for querying one or more resources, according to one embodiment.

FIG. 5 is a flowchart of a process for initiating one or more applications for querying one or more resources, according to one embodiment. In one embodiment, the querying platform 103 performs the process 500 and is implemented in, for instance, a chip set including a processor and a memory as shown in FIG. 8. In step 501, the querying platform 103 causes, at least in part, a presentation of a search user interface element for an entry of the input. Although, the querying platform 103 can use one or more search fields to receive the input, in step 501 the querying platform 103 can generate a search field specific to the querying platform 103 and present the search field as a search user interface element. The search user interface element allows a user of the UE, 101 to query a resource based on one or more terms without having to access another application 111 and/or service 109 and/or use a search field associated with the other application 111 or service 109. In one embodiment, the search user interface element may be presented as part of a home page of the UE 101, such as top level user interface element to allow for easy access to the functions of the querying platform 103.

Further, where the querying platform 103 causes a presentation of a search user interface element, the search user interface element may provide a predictive input. The predictive input may be for the at least one resource identifier, the one or more terms, or a combination thereof. The predictive input allows for one or more recommendations for the resource identifier, the one or more terms, or a combination within the input as a user enters one or more characters. By way of example, as the user enters characters for the resource identifier, the querying platform 103 may recommend one or more possible resource identifiers based on past resource identifiers the user has entered at the UE 101. Similarly, as the user enters characters for the one or more terms, the querying platform 103 may recommend one or more possible terms. However, in one or more embodiments, the querying platform 103 may further provide predictive input associated with one or more search fields that are not generated or presented in response to the querying platform 103.

In step 503, when the one or more resources associated with an entered resource identifier include, at least in part, one or more applications, the querying platform 103 may cause, at least in part, an initiation of the one or more applications for performing querying of the one or more resources, the presentation of the content, or a combination thereof. By way of example, when the search user interface element is presented, such as at a home page of the UE 101, the querying platform 103 may cause an application identified by the resource identifier or associated with the resource to initiate. For example, the querying platform 103 may cause an email application to start to allow a user to query emails based on the one or more terms. Further, a calendar application may start that allows a user to query appointments based on the one or more terms. Upon the applications initiating, the querying platform 103 causes the querying associated with the applications.

In addition to the querying, the querying platform 103 may also cause a presenting of the content performed by the initiated applications. Thus, in the above examples, the one or more emails or one or more appointments that constitute the content may be presented by the initiated applications 111. Thus, the user can access one or more additional functions in response to the query using the native functions associated with the applications 111. Further, although the applications 111 may be presenting the content, the content may be further emphasized by the querying platform 103 causing the applications 111 to emphasize the content, as discussed above.

Figure 6A:
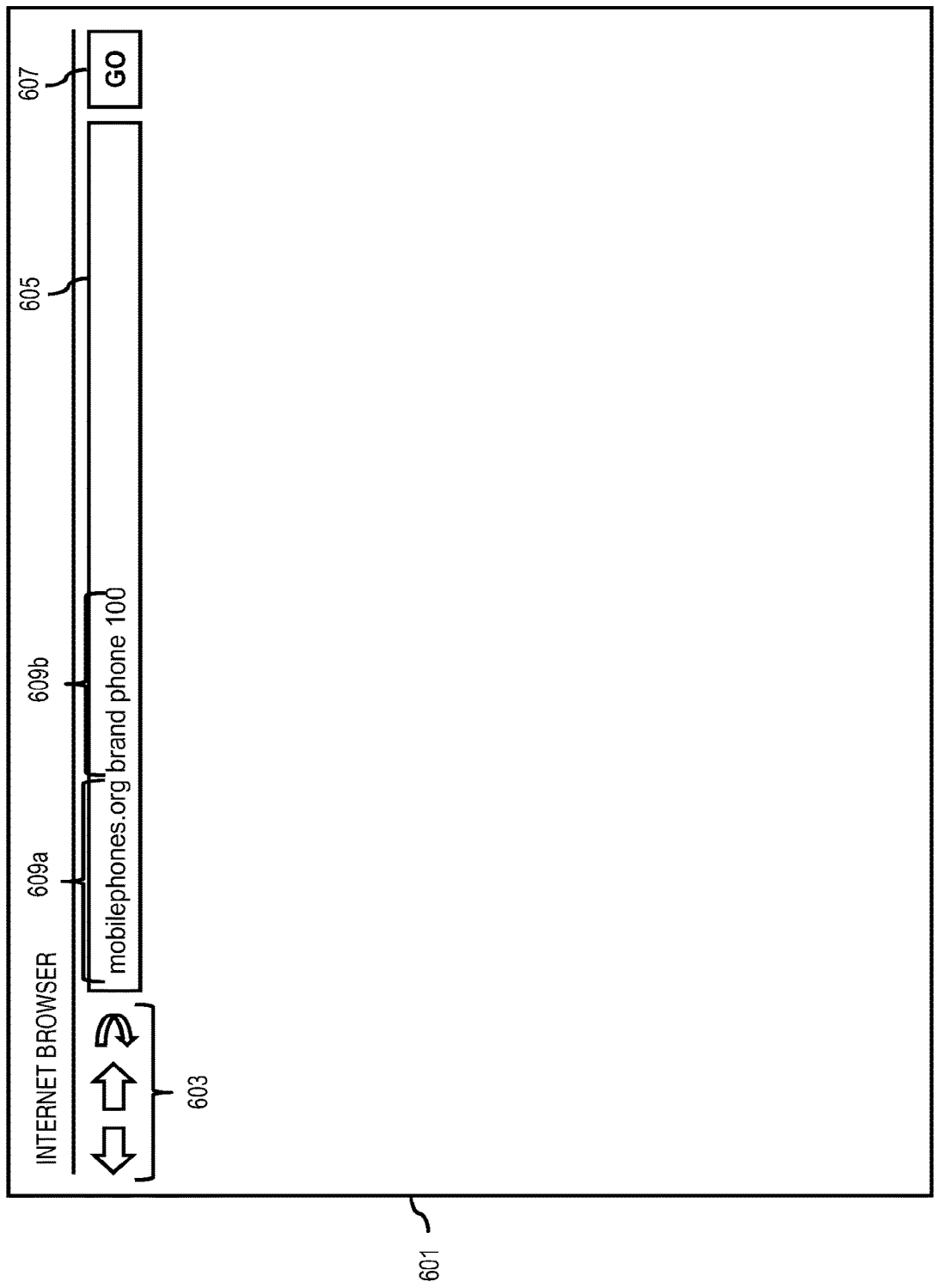

FIGS. 6A-6F are diagrams of user interfaces utilized in the processes of FIGS. 3-5, according to various embodiments. FIG. 6A illustrates a user interface 601 associated with, for example, an Internet browser application 111*a* of the UL 101. The user interface 601 may include indicators 603 for navigating between websites on the Internet. Further, the user interface 601 may include an address bar 605 that conventionally allows a user to enter an address, such as a URL, of a website. Further, the user interface includes an indicator 607 that, when selected by a user, causes the Internet browser application 111*a* to navigate to the website associated entered in the address bar. However, for the embodiment illustrated in FIG. 6A, the querying platform 103 may interface with the Internet browser application 111*a* such that a user may treat the address bar 605 as a search field. The user may enter at least one resource and one or more terms into the address bar (e.g., search field) as an input corresponding to portion 609*a* and portion 609*b* (collectively referred to as input 609). As illustrated, the portion 609*a* corresponds to the resource identifier (e.g., mobilesphones.org). Further, the portion 609*b* corresponds to the one or more terms (e.g., brand, phone, and 100). Upon the user selecting the entered input 609, such as by selecting the indicator 607, the querying platform 103 may determine the resource identifier 609*a* and the one or more terms 609*b*, cause a querying associated with the corresponding identified resource, and present content in response to the input, as discussed in detail above.

Figure 6B:
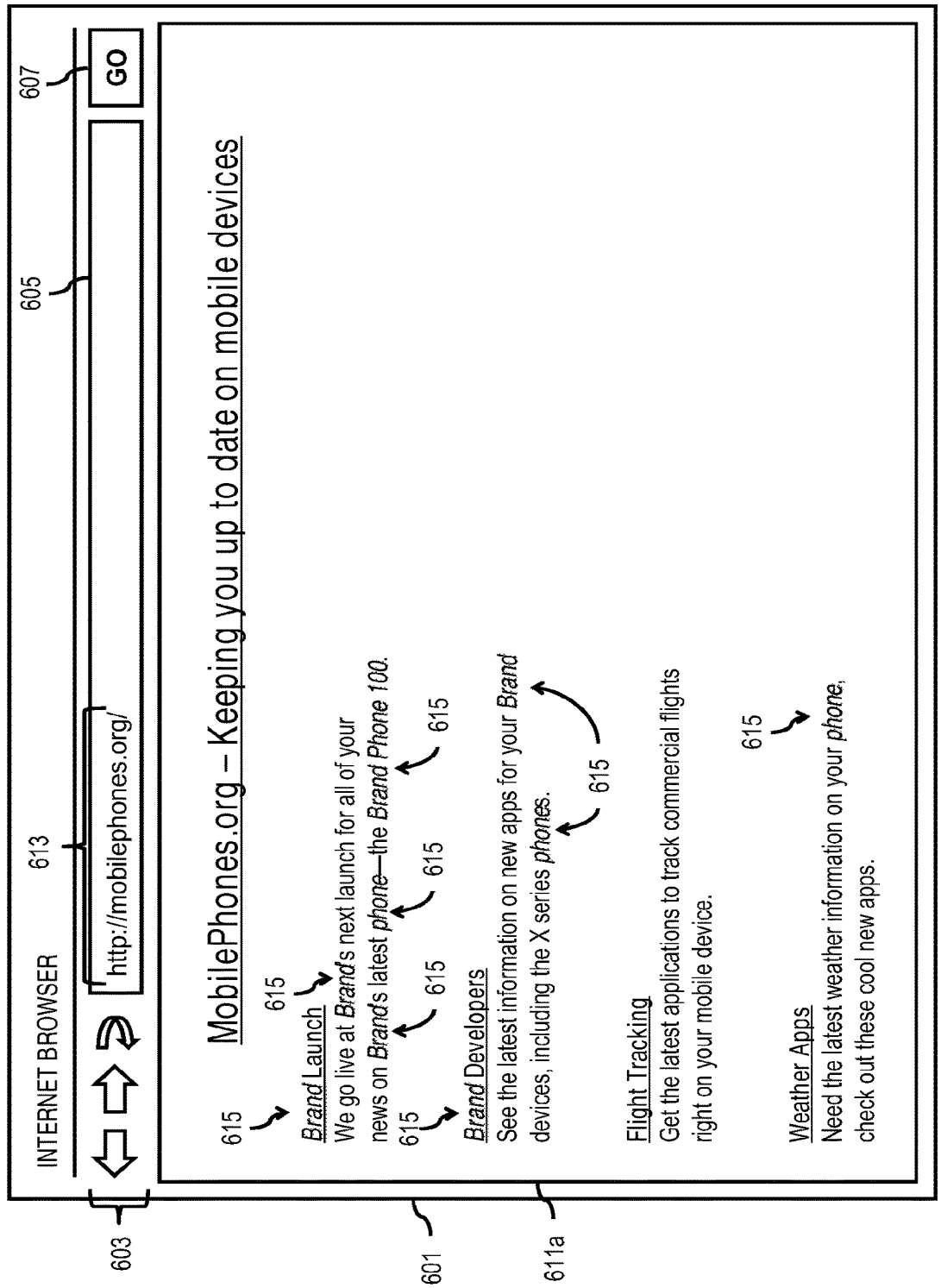

As a result, FIG. 6B illustrates content 611a presented in response to the input 609. The content 611a may be from the resource indentified by portion 613 (e.g., http://mobilephones.org/) that corresponds to the resource identifier 609a. By way of example, the content 611a may be a website regarding mobile devices. The querying platform 103 may have directed the Internet browser application 111a to navigate to the resource 613 in response to the resource identifier 609a in the address bar 605, which the querying platform 103 treated as a search field. Further, the querying platform 103 queried the resource 613 for the one or more terms 609b within the content 611a. To further emphasize the one or more terms 609b within the content 611a, the querying platform 103 caused an emphasizing of the one or more terms (e.g., emphasized terms 615) in the content 611a. Based on the emphasized terms 615, the user can more easily locate within the content 611a the one or more terms 609b that were in the original input 609 and that the user was looking for. In one embodiment, the querying platform 103 may interface with the Internet browser application 111a associated with the user interface 601 to cause the Internet browser application 111a to emphasize the one or more terms by using one or more native functions associated with the Internet browser application 111a, such as a find function.

FIG. 6C illustrates the same user interface 601 of FIG. 6A except for a different resource identifier 617a and different terms 617b (collectively referred to as input 617). Here, the resource identifier 617a may refer to an Internet search engine service 109 that allows a user to search the Internet for one or more keywords. Further, the one or more terms 617b may refer to one or more keywords that the user would like to query the Internet search engine service 109. Upon the user selecting the entered input 617, such as by selecting the indicator 607, the querying platform 103 may determine the resource identifier 617a and the one or more terms 617b, cause a querying of the resource corresponding to the resource identifier 617a, and present content in response to the input, as discussed in detail above.

Figure 6D:
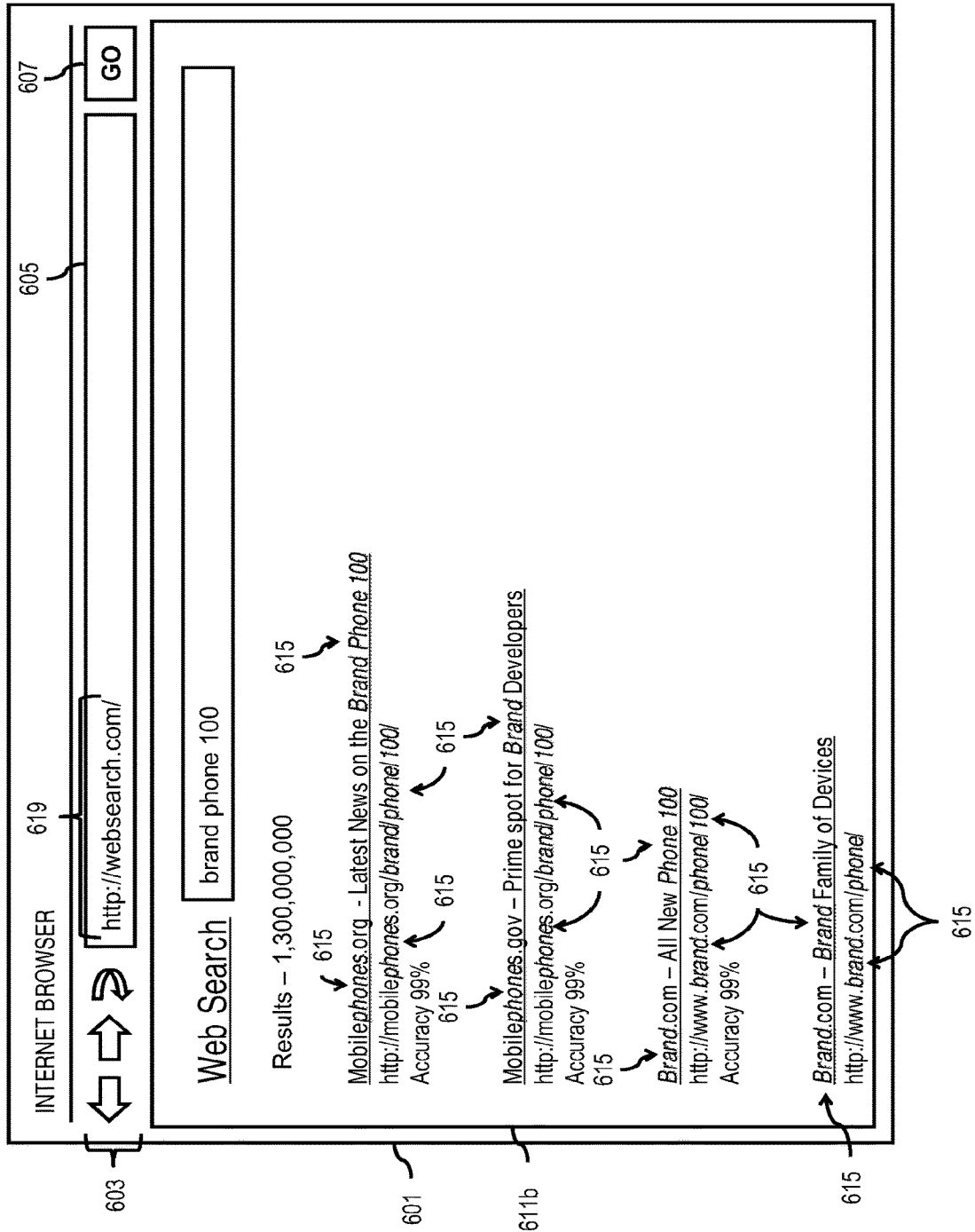

As a result, FIG. 6D illustrates content 611b presented in response to the input 617. The content 611b may be from the resource indentified by portion 619 (e.g., http://websearch-.com/) that corresponds to the resource identifier 617a. By way of example, the content 611b may one or more results from an Internet search engine. The querying platform 103 may have directed the Internet browser application 111a to navigate to the resource 619 in response to the resource identifier 617a in the address bar 605, which the querying platform 103 treated as a search field. Further, the querying platform 103 caused the Internet search engine to query for the one or more terms 617b in the Internet using the algorithms and/or processes of the Internet search engine. To further emphasize the one or more terms 617b within the content 611b, the querying platform 103 caused an emphasizing of the one or more terms (e.g., emphasized terms 615) in the content 611b. Based on the emphasized terms 615, the user can more easily locate within the content 611b the one or more terms 617b that were in the original input 617.

FIG. 6E illustrates a user interface 621 associated with a home page of a UE 101. The user interface 621 may include an input element 623, such as a graphical representation of a keyboard, for entering characters into a search field 625. As illustrated, the search field 625 includes the characters m.dom representing a partial resource identifier entry 627 of a resource identifier. Further, the user interface 621 includes a predictive input portion 629 that, based on the partial resource identifier entry 627 input in the search field 625, recommends a resource identifier to complete the partial resource identifier entry 627. By way of example, the recommendation for the input m.dom is the resource identifier m.domain.com. However, depending on the partial resource identifier entry 627 and the predictive ability, one letter may be enough to provide one or more recommended resource identifier within the predictive input portion 629. Such as the user entering d and the predictive input portion 629 including the resource identifier m.domain.com. Thus, a user may either continue manually entering additional characters to complete the partial resource identifier entry 627 or may select the recommended input.

In one embodiment, the user may implicitly select a recommended resource identifier with the predictive input portion 629 by continuing to enter one or more terms. By way of the example illustrated, the user may enter the partial resource identifier entry 627 of m.dom. Rather than manually entering the rest of the resource identifier, or selecting a recommended resource identifier with the predictive input portion 629, the user may implicitly select m.domain.com by entering a space and continuing to enter characters associated with, for example, the one or more terms. Such an implicit selection may be based on the first or only recommended resource identifier provided in the predictive input portion 629.

Although only one recommended input for the partial resource identifier entry 627 is illustrated in the predictive input portion 629, more than one may be recommended. Further, in one embodiment, upon the user entering the resource identifier or selecting a recommended resource identifier, the querying platform 103 may navigate to the resource associated with the resource identifier prior to the user entering one or more terms. In one embodiment, as the user enters the partial resource identifier entry 627, the querying platform 103 may navigate to one or more resources associated with the recommended resource identifiers within the predictive input portion 629 in anticipation or expectation of the user selecting one of the recommended resource identifiers.

FIG. 6F illustrates the user interface 621 of FIG. 6E after completion of the partial resource identifier entry 627, either by the user manually completing the resource identifier or by selecting a recommended identifier provided within the predictive input portion 629, and displaying the completed resource identifier 631. The user interface 621 may further include a predictive input portion 633 for recommending one or more terms. Thus, after entry of the completed resource identifier 631, the user can start entering letters representing one or more terms that the user is interested in querying the resource associated with the completed resource identifier 631. As illustrated, the search field 625 includes partial entry of the characters bra representing a partial entry of one or more terms. The predictive input portion 633 may be based on the partial entry 635 of one or more terms after the completed resource identifier 631. As illustrated, based on the partial entry 635 of the term bra, the predictive input portion 629 may recommend the six combinations of one or more terms, including the term brand alone, or in combination with the term phone and various three digit numbers. As the user enters more characters, the list of terms within the predictive input portion 633 can be narrowed. The user may either continue manually entering the one or more terms or select one of the recommended predictive inputs from the predictive input portion 629.

Upon manually entering a term or selecting a predictive input term, the user may begin entering another term, which the predictive input portion 633 can provide additional recommended terms for. Although only one term of the partial entry 635 is illustrated, multiple terms may be inputted and predicted based on the predictive input portion 633. Based on the predictive input portions 629 and 633, a user can, with little input, find the result he or she is interested in. In one embodiment, as the user enters the partial entry 635 of one or more terms, the querying platform 103 may cause a navigation to the resource associated with the completed resource identifier 631. In one embodiment, the querying platform 103 may cause a querying of the partial entry 635 of the one or more terms, one or more terms within the predictive input portion 633, or a combination thereof for a resource associated with the completed resource identifier 631. In one embodiment, a camera associated with the UE 101 displaying the user interface 621 may be used to enter one or more characters or images, such as quick response (QR) codes or bar codes, to enter one or more terms or partial terms for determining recommended terms presented within the predictive input portion 633, or by entering one or more terms independent of the predictive input portion 633.

In one embodiment, as described above, terms within the content of the resource associated with the completed resource identifier 631 may be used to determine the terms presented in the predictive input portion 633. By way of example, upon entry of the completed resource identifier 631, the resource associated with the completed resource identifier 631 may be loaded in the background based on the querying platform 103. The content of the resource may be obtained and words beginning with the partial entry 635 of bra may be queried within the content. Then, the predictive input portion 633 may present the results of the query as recommended one or more terms to complete the partial entry 635. Based on the example illustrated in FIG. 6F, the term brand may appear in the content of the resource associated with the completed resource identifier 631. Further, the terms phone, 100, 110, 120 and 200 may appear in association with the term brand within the content. Such an association may be presented with respect to the term brand, as illustrated within the predictive input portion 633. In one embodiment, one or more terms may be presented within the predictive input portion 633 and those terms appearing in the content of a resource associated with the completed resource identifier 631 may be presented with a higher priority as compared to other terms not appearing in the content, such as appearing at the top of the predictive input portion 633. By way of a further example, and where the user implicitly selected a resource identifier, the user may simply enter d bra and the querying platform 103 may cause a navigation to the resource associated with the resource identifier of m.domain.com based on the implicit selection and query for terms beginning with bra.

The processes described herein for providing a querying of one or more resources based on one or more terms from an input within at least one search field may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
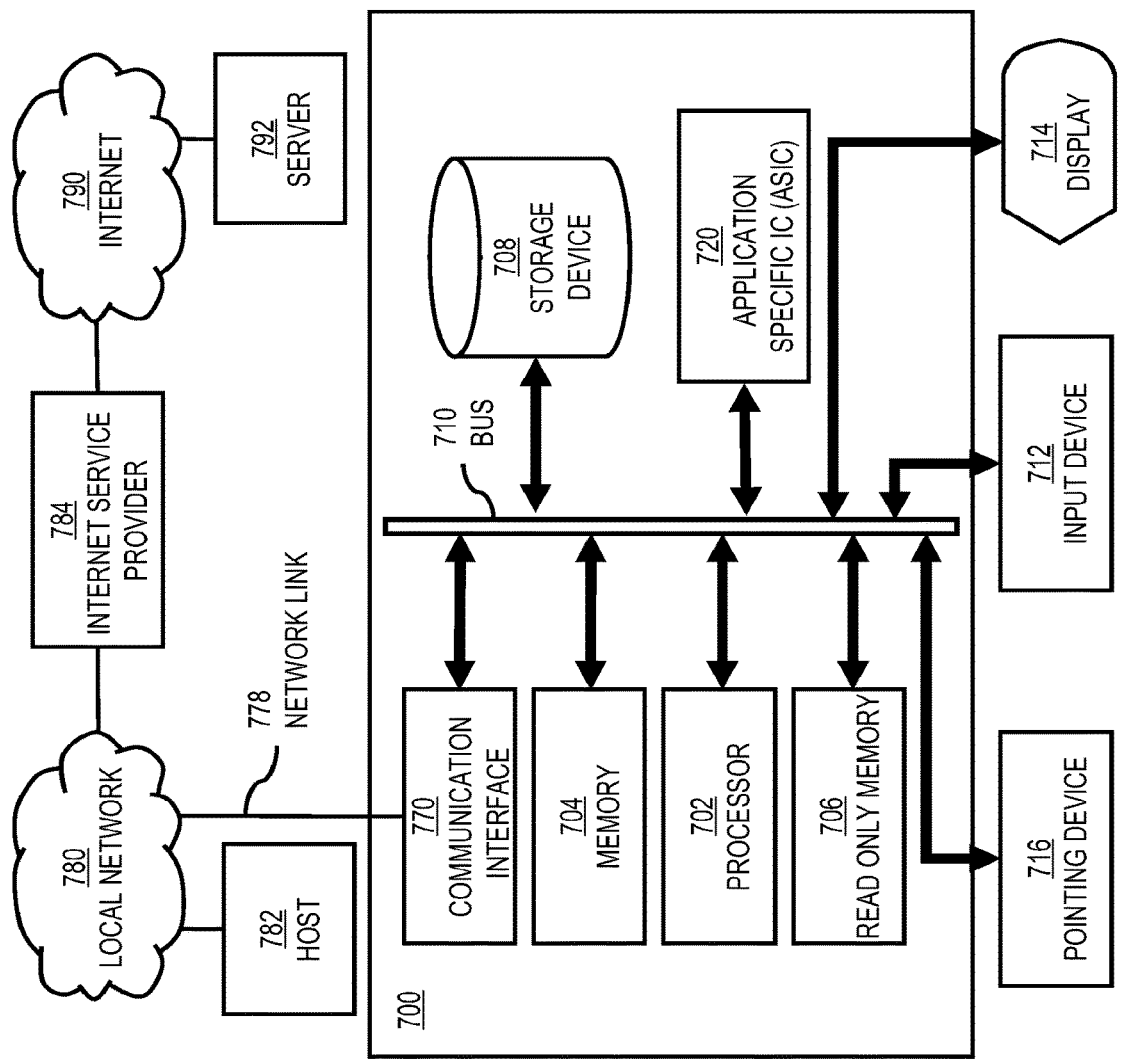
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide a querying of one or more resources based on one or more terms from an input within at least one search field as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing a querying of one or more resources based on one or more terms from an input within at least one search field.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to providing a querying of one or more resources based on one or more terms from an input within at least one search field. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for providing a querying of one or more resources based on one or more terms from an input within at least one search field. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing a querying of one or more resources based on one or more terms from an input within at least one search field, is provided to the bus 710 for use by the processor from an external input device 712, such as a keyboard containing alphanumeric keys operated by a human user, a microphone, an Infrared (1R) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing a querying of one or more resources based on one or more terms from an input within at least one search field to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to provide a querying of one or more resources based on one or more terms from an input within at least one search field as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of providing a querying of one or more resources based on one or more terms from an input within at least one search field.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to providing a querying of one or more resources based on one or more terms from an input within at least one search field. The memory 805 also stores the data associated with or generated by the execution of the inventive steps.

Figure 9:
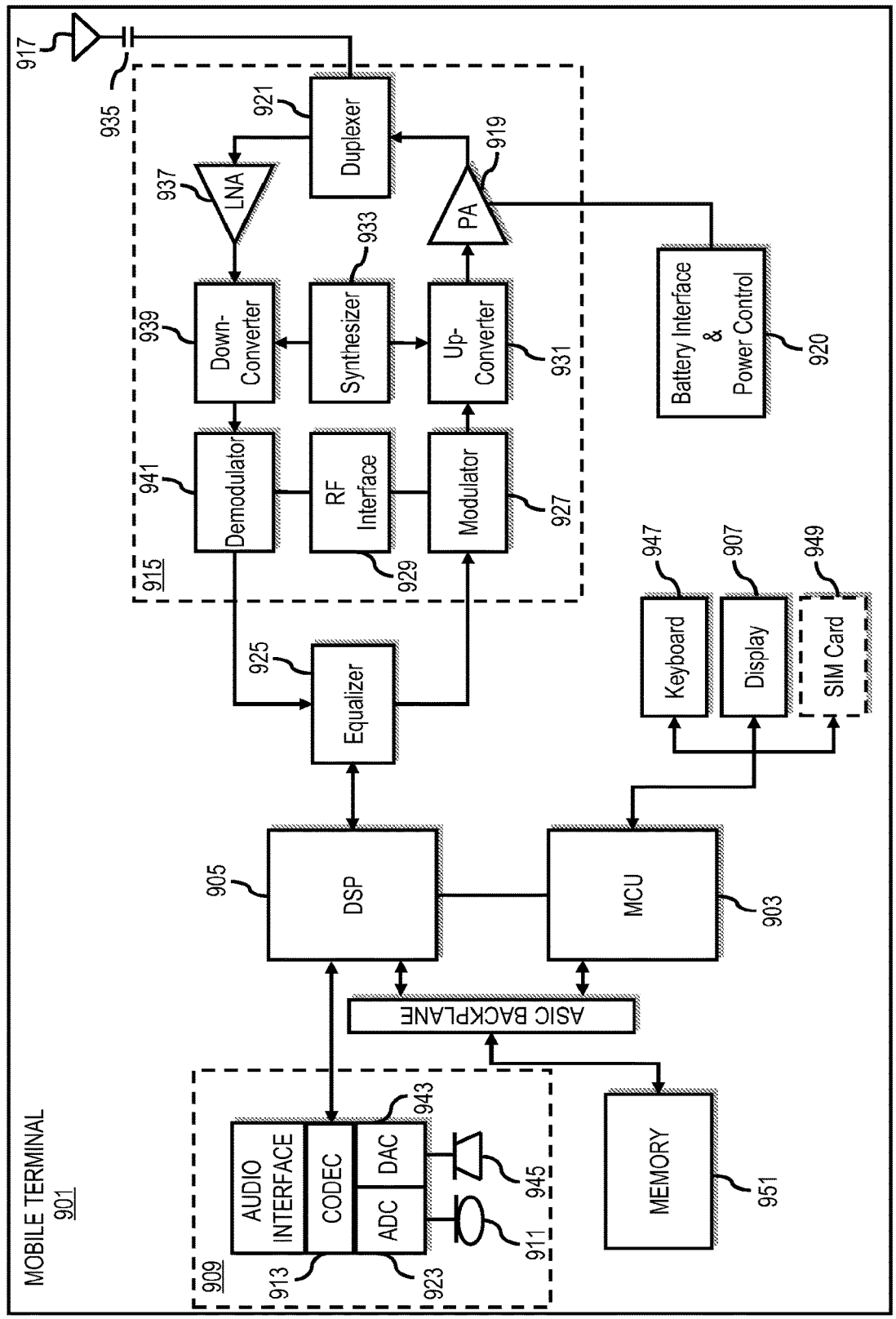
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of providing a querying of one or more resources based on one or more terms from an input within at least one search field. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing a querying of one or more resources based on one or more terms from an input within at least one search field. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide a querying of one or more resources based on one or more terms from an input within at least one search field The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. An apparatus comprising:
   at least one processor; and
   at least one memory including computer program code for one or more programs,
   the at least one memory and the computer program code configured to, with the at least one processor, cause the apparatus to perform at least the following,
   receive at least one search term and at least one identifier in a search field in a home screen of a device, wherein the at least one identifier corresponds to at least one application each of which is internal to the device, and wherein the at least one identifier is pre-defined for the at least one application by a user specifying the at least one identifier;
   send the at least one search term to the at least one application based on the at least one identifier;
   cause, without user intervention, the at least one application to search based on the at least one search term and generate one or more search results; and
   display the one or more search results with the at least one search term on the home screen of the device.

2. The apparatus of claim 1, wherein the search field presents in the home screen via a widget that is independent from the at least one application.

3. The apparatus of claim 1, wherein the at least one search term is highlighted in the search results.

4. The apparatus of claim 1, wherein the at least one application searches one or more resources local, external, or a combination thereof to the device based on the at least one search term.

5. The apparatus of claim 1, wherein the apparatus is further caused to:
   cause the at least application to display the search results with the at least one search term on a user interface.

6. The apparatus of claim 1, wherein the apparatus is further caused to:
   display on the home screen the at least one application, before the at least one search term is sent to the at least one application.

7. The apparatus of claim 1, wherein the apparatus is further caused to:
   initiate, without user intervention, the at least one application when determining that the at least one application is not running.

8. The apparatus of claim 1, wherein the at least one application searches based on one or more functions, one or more processes, or a combination thereof that are internal to the at least one application.

9. The apparatus of claim 1, wherein the apparatus is further caused to:
   determine that one of the at least one application is implicitly selected by a user of the device, when at the least one search term is partially entered, a space is entered, and one or more characters are entered in the search field.

10. The apparatus of claim 1, wherein the apparatus is further caused to:
    determine that one of the at least one application is implicitly selected by a user of the device, when the one application is a first or only recommended resource display on the home screen.

11. The apparatus of claim 1, wherein the at least one search term is partially predicted before fully entered into the search field.

12. The apparatus of claim 1, wherein at least one of the at least one application has an identifier at least partially matches the at least one search term.

13. The apparatus of claim 1, wherein the at least one application includes an email application, a calendar application, a phonebook application, a file system application, an operating system, a file explorer, a querying application, or a combination thereof.

14. A method comprising:
    receiving at least one search term and at least one identifier in a search field in a home screen of a device, wherein the at least one identifier corresponds to at least one application each of which is internal to the device, and wherein the at least one identifier is pre-defined for the at least one application by a user specifying the at least one identifier;
    sending the at least one search term to the at least one application based on the at least one identifier;
    causing, without user intervention, the at least one application to search based on the at least one search term and generate one or more search results; and
    displaying the one or more search results with the at least one search term on the home screen of the device.

15. The method of claim 14, wherein the search field presents in the home screen via a widget that is independent from the at least one application.

16. The method of claim 14, wherein the at least one application searches based on one or more functions, one or more processes, or a combination thereof that are internal to the at least one application.

17. A non-transitory computer-readable storage medium, carrying one or more sequences of one or more instructions which, when executed by one or more processors, cause an apparatus to perform:

receiving at least one search term and at least one identifier in a search field in a home screen of a device, wherein the at least one identifier corresponds to at least one application each of which is internal to the device, and wherein the at least one identifier is predefined for the at least one application by a user specifying the at least one identifier;

sending the at least one search term to the at least one application based on the at least one identifier;

causing, without user intervention, the at least one application to search based on the at least one search term and generate one or more search results; and displaying the one or more search results with the at least one search term on the home screen of the device.

18. The non-transitory computer-readable storage medium of claim 17, wherein the search field presents in the home screen via a widget that is independent from the at least one application.

19. The non-transitory computer-readable storage medium of claim 17, wherein the at least one application searches based on one or more functions, one or more processes, or a combination thereof that are internal to the at least one application.

\* \* \* \* \*